United States Patent
Hall et al.

(10) Patent No.: US 7,545,878 B1
(45) Date of Patent: Jun. 9, 2009

(54) EFFICIENT CIRCULAR CLIPPING IMPLEMENTATION USING SIMPLIFIED CORDIC ROTATORS

(75) Inventors: Eric K. Hall, Sandy, UT (US); Richard B. Ertel, Sandy, UT (US); Dan M. Griffin, Bountiful, UT (US); Thomas R. Giallorenzi, Riverton, UT (US)

(73) Assignee: L-3 Communications Corporation, New York, NY (US)

(*) Notice: Subject to any disclaimer, the term of this patent is extended or adjusted under 35 U.S.C. 154(b) by 1340 days.

(21) Appl. No.: 10/608,374

(22) Filed: Jun. 26, 2003

(51) Int. Cl.
    *H04B 15/00* (2006.01)
(52) U.S. Cl. .................................................. 375/285
(58) Field of Classification Search ................ 375/148, 375/278, 285, 296, 346, 350; 455/245.2
    See application file for complete search history.

(56) References Cited

U.S. PATENT DOCUMENTS

| | | | | |
|---|---|---|---|---|
| 5,524,286 A | 6/1996 | Chiesa et al. | ............... | 455/126 |
| 6,192,089 B1 | 2/2001 | Corleto et al. | ............... | 375/344 |
| 6,266,320 B1 | 7/2001 | Hedberg et al. | ............ | 370/206 |
| 2002/0159551 A1* | 10/2002 | Ekvetchavit et al. | ........ | 375/350 |
| 2002/0197970 A1 | 12/2002 | Jian et al. | ................ | 455/245.2 |
| 2003/0174641 A1 | 9/2003 | Rahman | ..................... | 370/206 |
| 2004/0013209 A1 | 1/2004 | Zehavi et al. | ................ | 375/334 |
| 2004/0057503 A1 | 3/2004 | Kelley | ......................... | 375/148 |
| 2006/0282489 A1 | 12/2006 | Khan et al. | .................. | 708/422 |
| 2007/0210958 A1* | 9/2007 | Van Wechel et al. | ... | 342/357.12 |

OTHER PUBLICATIONS

Andraka, Ray, "A survey of CORDIC algorithms for FPGA based computers", FPGA1998, Monterey, CA, 10 pages.

* cited by examiner

*Primary Examiner*—Don N Vo
(74) *Attorney, Agent, or Firm*—Harrington & Smith, PC

(57) ABSTRACT

A system for the efficient use of CORDIC rotators is provided. The system includes at least one first rotator operating in vector mode and includes a sign storage buffer. The system also includes at least one bit inverter coupled between the first rotator and a second rotator, the second rotator operating in rotation mode.

12 Claims, 3 Drawing Sheets

EFFICIENT CIRCULAR CLIPPING IMPLEMENTATION USING SIMPLIFIED CORDIC ROTATORS

CROSS-REFERENCE TO RELATED APPLICATIONS

This application is related to U.S. application Ser. No. 10/608,489, filed Jun. 26, 2003, now U.S. Pat. No. 7,313,196, issued Dec. 25, 2007, which is incorporated by reference herein in its entirety.

BACKGROUND OF THE INVENTION

1. Field of the Invention

The present invention relates to CORDIC rotator systems and, more particularly, to simplified CORDIC rotators in CDMA communication systems and other hardware implementations.

2. Prior Art

Many algorithms designed for communications, navigation, robotics, and digital signal processing generally do not translate efficiently to a hardware implementation and must rely upon software to execute.

In one example, many digital communications systems utilize amplitude and phase modulation, producing complex baseband signals, which are pulse shaped before modulation to the carrier frequency. The complex, baseband signals are typically represented as an in-phase signal (I) and a quadrature signal (Q). For many modulation formats and multiple access schemes, these complex baseband signals have large peak values relative to the average signal value. When the peak-to-average power ratio of the baseband signal is large, the signal requires reduction in the power amplifier to avoid saturation. The peak-to-average power ratio limits the average power that can be transmitted due to the finite maximum output power of the power amplifier in the RF front-end (RFFE). Alternatively, for a fixed average transmit power, the peak-to-average power ratio will determine the required maximum output power of the RF power amplifier. In both cases, a decreased peak to average power ratio is desirable.

To decrease the peak-to-average power ratio of the signal, many digital communications systems employ clipping, also termed amplitude limiting, on the baseband complex signal. Clipping suppresses the signal peaks, reducing the peak-to-average power ratio of the signal with minimal signal distortion. The most common and effective form of clipping is circular clipping, which preserves the angle of the complex signal while limiting the maximum magnitude. Circular clipping follows the input-output relation, $$I_{out} = \begin{cases} I_{in} & : I_{in}^2 + Q_{in}^2 \le P_{P_{out}} \\ I_{in} \cdot \sqrt{P_{P_{out}}/(I_{in}^2 + Q_{in}^2)} & : I_{in}^2 + Q_{in}^2 > P_{P_{out}} \end{cases}$$

$$Q_{out} = \begin{cases} Q_{in} & : I_{in}^2 + Q_{in}^2 \le P_{P_{out}} \\ Q_{in} \cdot \sqrt{P_{P_{out}}/(I_{in}^2 + Q_{in}^2)} & : I_{in}^2 + Q_{in}^2 > P_{P_{out}} \end{cases}$$

In hardware implementations, circular clipping is often implemented using a look-up table (LUT). A LUT implementation avoids the need to compute the constellation magnitude, implement the square root, and division functions as are done in U.S. Pat. No. 6,266,320 to Hedberg et al.; these functions, as well as others, are complex operations for digital hardware. With a LUT-implementation, the LUT holds the output I and Q ($I_{out}, Q_{out}$) values for all possible combinations of input values ($I_{in}, Q_{in}$). When the number of possible input I and Q values is small, the LUT approach is attractive. However, as the number of possible I and Q input values increases the size of the memory used to store the LUT must grow proportionately. With 10-bit input (I,Q) values and 8-bit (I,Q) output values, the LUT would require a memory of size 2,097,152 bytes. If the input constellation is symmetric in the four quadrants, the LUT size may be reduced by a factor of four, but still requires a large memory of size 524,288 bytes. In many applications a LUT-based circular clipper may be impractical when the number of possible input I and Q values is large.

In still other hardware implementations to solve complex algorithms is the use of CORDIC rotators. Yet, even CORDIC rotators require the use of LUTs.

Therefore, it is desirable to provide a hardware efficient method and system to solve complex algorithms.

SUMMARY OF THE INVENTION

The foregoing and other problems are overcome, and other advantages are realized, in accordance with the presently preferred embodiments of these teachings.

In accordance with one embodiment of the present invention a system for the efficient use of CORDIC (Coordinate Rotation DIgital Computer) rotators is provided. The system includes at least one first rotator operating in vector mode and includes a $d_i$ storage buffer for the angle direction vector. The system also includes at least one bit inverter coupled between the first rotator and a second rotator, the second rotator operating in rotation mode.

In accordance with another embodiment of the present invention a system for baseband amplitude limiting is provided. The system includes an improved CORDIC vector mode rotator device having a $d_i$ storage buffer in addition to a gain device and limiter. The system also includes a second CORDIC rotator operating in rotation mode, and is coupled to the limiter.

In accordance with another embodiment a method for limiting the amplitude of complex signals is provided. The method includes the steps of rotating and limiting a voltage vector magnitude. The next steps generate a signal based upon the limited and rotated voltage vector magnitude. The signal includes at least x-component and at least one y-component.

The invention is also directed towards a method for limiting the peak-to-average power ratio of a plurality of complex telecommunications signals. The method includes the steps of summing $I_0 \ldots I_n$ and $Q_0 \ldots Q_n$ signals to produce an $$I_{in} = \sum_{k=0}^{n} I_k \text{ and } Q_{in} = \sum_{k=0}^{n} Q_k$$

composite signal, respectively, and where n is predetermined, e.g., number of channels. The next steps determine a peak power vector and an average power level. The peak power vector is compared to the average power level and adjusted according to the comparison.

In accordance with another embodiment of the invention a program storage device readable by a machine is provided. The program storage device tangibly embodies a program of instructions executable by the machine to perform method steps for limiting the amplitude of complex signals. The method includes the steps of rotating and limiting a voltage vector magnitude and generating a signal based upon the limited first voltage vector magnitude. The signal includes at least one x-component (in-phase signal I) and at least one y-component (quadrature phase signal Q).

In accordance with another embodiment the invention is also directed towards a method for efficiently limiting a vector magnitude. The method includes the step of providing a first vector having magnitude and direction. The next step iteratively rotates the vector through diminishing angles to a reference angle such that the vector angle is substantially zero and each angle direction is stored in a direction vector. Once the reference axis is reached the next step limits the vector magnitude to a predetermined magnitude to form a second vector. The last step rotates the second vector through a second angle according to each angle direction stored in the first direction vector.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
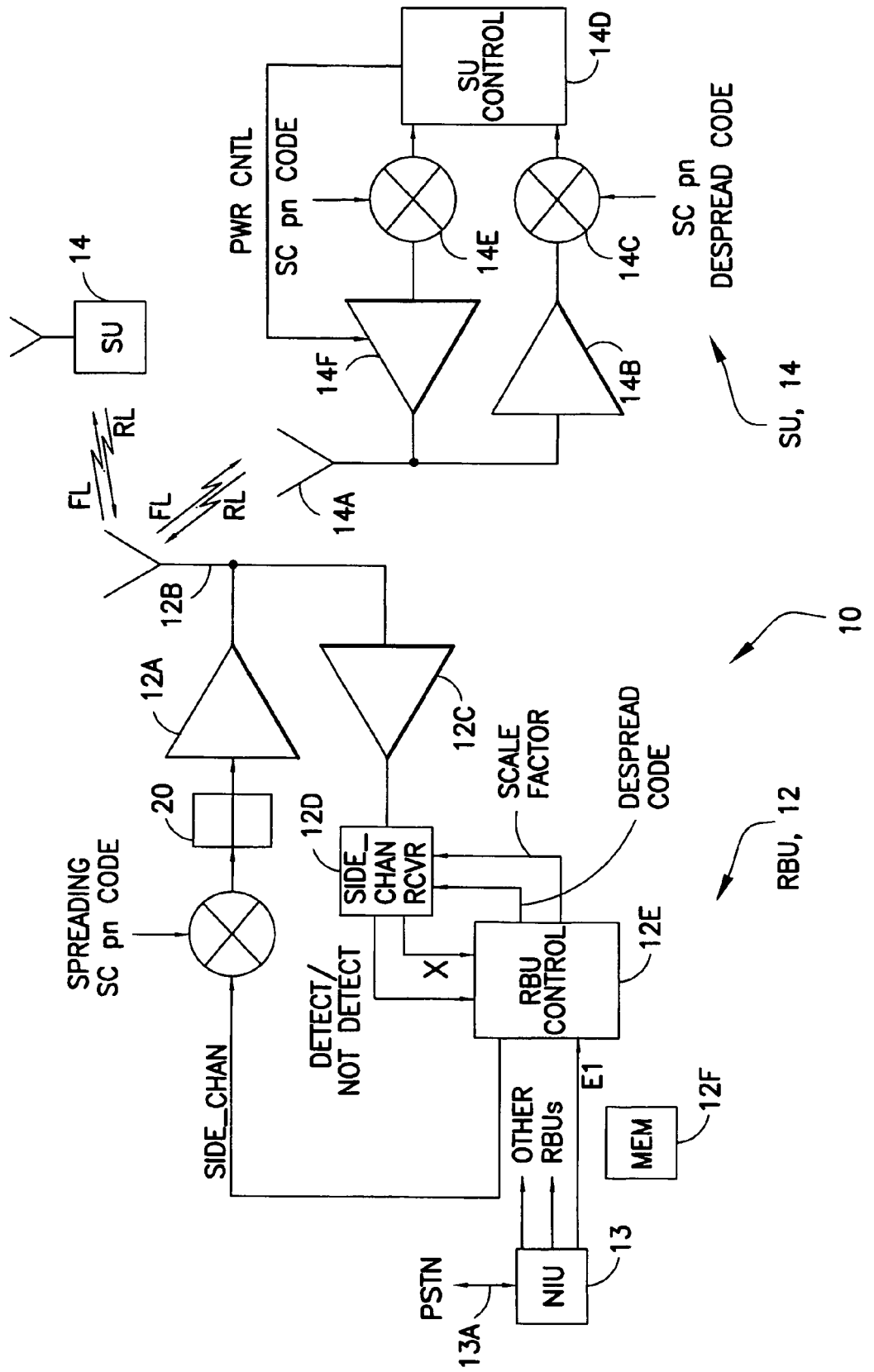
FIG. 1 is a block diagram of a communications system implementing baseband amplitude limiting features of the present invention.

Referring to FIG. 1, there is shown a pictorial diagram of a multi-user communications system incorporating features of the present invention. Although the present invention will be described with reference to the embodiment shown in the drawings, i.e., a method and system to decrease a peak-to-average power ratio of a communications signal before the signal is amplified by a power-amplifier, it should be understood that the present invention could be embodied in many alternate forms of embodiments. For example, the invention may be embodied in any suitable device requiring the solution of complex algorithms such as navigation systems, radar systems, robotics, computers, or handheld calculators.

Still referring to FIG. 1 there is shown a Fixed Wireless System (FWS) 10 that is suitable for practicing this invention. Specifically, the FWS 10 employs direct sequence spread spectrum based CDMA techniques over an air link to provide local access to subscribers, and offers very high quality, highly reliable service. The FWS 10 is a synchronous CDMA (S-CDMA) communications system wherein forward link (FL) transmissions from a base station, referred to also as a radio base unit (RBU) 12, for a plurality of transceiver units, referred to herein as user or subscriber units (SUs) 14, are symbol and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU 12, and to generally perform bi-directional communications. The FWS 10 is suitable for use in implementing a telecommunications system that conveys multirate voice and/or data between the RBU 12 and the SUs 14.

The RBU 12 includes circuitry for generating a plurality of user signals ($USER_1$ to $USER_n$), which are not shown in FIG. 1, and a synchronous side channel ($SIDE_{chan}$) signal that is continuously transmitted. Each of these signals is assigned a respective PN spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components there from. The RBU 12 is capable of transmitting a plurality of frequency channels. By example, each frequency channel includes up to 128 code channels, and has a center frequency in the range of 2 GHz to 4 GHz.

The RBU 12 also includes a receiver 12c having an output coupled to a side channel receiver 12d. The side channel receiver 12d receives as inputs the spread signal from the receiver 12c, a scale factor signal, and a side channel despread PN code. These latter two signals are sourced from a RBU processor or controller 12e. The scale factor signal can be fixed, or can be made adaptive as a function of the number of SUs 14 that are transmitting on the reverse channel. The side channel receiver 12d outputs a detect/not detect signal to the RBU controller 12e for indicating a detection of a transmission from one of the SUs 14, and also outputs a power estimate value. A read/write memory (MEM) 12f is bi-directionally coupled to the RBU controller 12e for storing system parameters and other information, such as SU timing phase information and power estimate values.

A Network Interface Unit (NIU) 13 connects the RBU 12 to the public network, such as the public switched telephone network (PSTN) or the Internet 13a, through analog or digital trunks that are suitable for use with the local public network. The RBU 12 connects to the NIU 13 using E1 trunks and to its master antenna 12b using a coaxial cable. The SU 14 communicates with the RBU 12 via the radio interface, as described above.

In the illustrated embodiment the SU-RBU air link provides a separate 2.72 MHz (3.5 MHz including guard bands) channel in each direction separated by 100 MHz, 119 MHz, or 175 MHz. In alternate embodiments any suitable separation may be employed. The nominal spectrum of operation is 2.1-2.3 GHz or 2.5-2.7 GHz. However, the system is adaptable such that the frequency can be varied as required. In addition, before the I and Q signals are applied to transmitter 12a the Peak-to-Average power ratio of the signals are clipped to a desirable level by clipper 20 in accordance with the teachings of this invention. In general, circular clipping operates on the input $I_{in}$ and $Q_{in}$ values to compute output $I_{out}$ and $Q_{out}$ values such that the peak signal magnitude of the output is $Pp_{out} \leq Pp_{in}$. Circular clipping preserves the angle of the input I and Q pair but limits peak signal magnitude.

Figure 2:
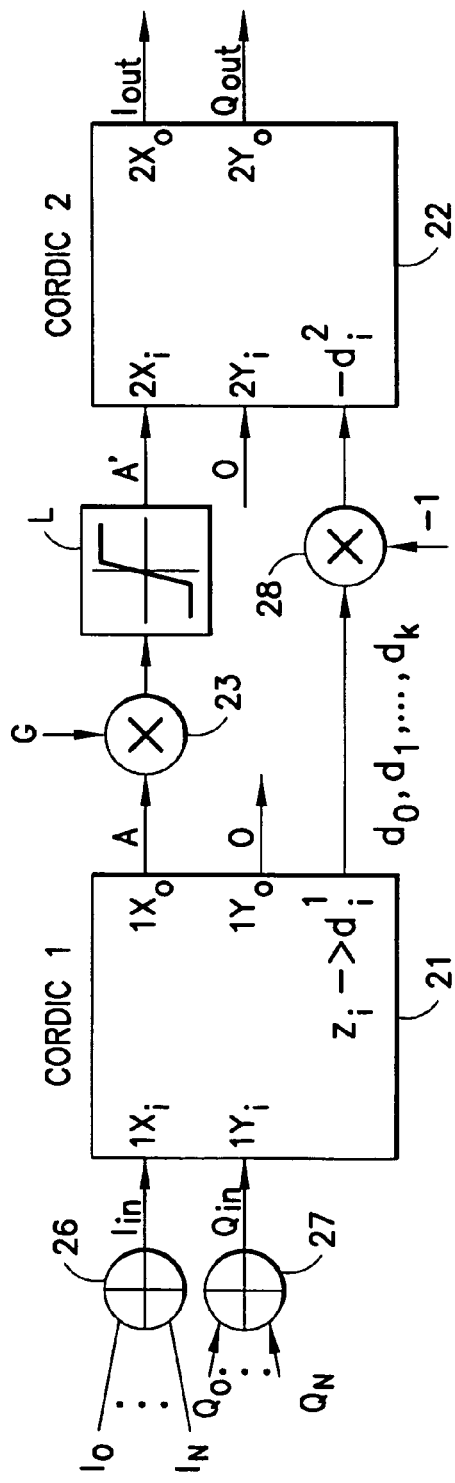
FIG. 2 is a block diagram of a preferred embodiment of a baseband amplitude-limiting feature shown in FIG. 1.

Referring to FIG. 2 there is shown a block diagram of a preferred embodiment of the present invention. The COordinate Rotation DIgital Computer (CORDIC) rotator 21 is known in the art and need not be discussed here other than to note that CORDIC rotators are normally operated in one of two possible modes. The rotation mode rotates the input vector by a specified angle. The other mode is the vectoring mode, which rotates the input vector to an arbitrary axis, nominally the x-axis while recording the angle required to make that rotation. Rotation mode essentially performs a change of coordinates from Cartesian coordinates (I and Q) to polar coordinates (magnitude and phase).

Referring now to FIG. 2 there is shown a block diagram of a circuit incorporating features of the present invention. In will be appreciated that in a preferred embodiment at least two CORDIC rotators 21,22 are used. In an alternate embodiment any suitable rotator or CORDIC-like device may be used. Also, in a preferred embodiment CORDIC rotator 21 is operated in vector mode while CODIC rotator 22 is operated in rotation mode.

Referring still to FIG. 2, CORDIC 21 operates in a preferred vectoring mode with inputs $x_0=I_{in}$, and $y_0=Q_{in}$. In a preferred embodiment the $I_{in}$ and $Q_{in}$ signals are 8-bits and the $I_{out}$ and $Q_{out}$ signals are 10-bits. In alternate embodiments any suitable bit length could be used. The x and y values are recursively updated using the following set of equations where the CORDIC rotator 21 computes $$x_{i+1} = x_i - y_i d_i^1 2^{-i}$$

$$y_{i+1} = y_i - x_i d_i^1 2^{-i}$$

$$d_i^1 = \begin{cases} -1 & y_i > 0 \\ +1 & y_i \le 0 \end{cases}$$

where i is the iteration number.

For implementation, x, y and $d_i^1$ storage buffers are required. In a preferred embodiment the number of iterations is ten. However, it will be recognized that any number of suitable number of iterations may be used to achieve the desired accuracy.

In vectoring mode with I iterations, the final outputs of CORDIC 21 are $$x_I=1.647 \cdot \sqrt{x_0^2 y_0^2}=A$$

$$y_I=0$$

Here, A is the magnitude of the complex input signal ($I_{in}$+ $jQ_{in}$) while θ is the angle in radians. As can be seen, CORDIC 21 operating in vectoring mode converts the input signal from Cartesian to a vector magnitude with a small scaling on the magnitude.

Figure 2C:
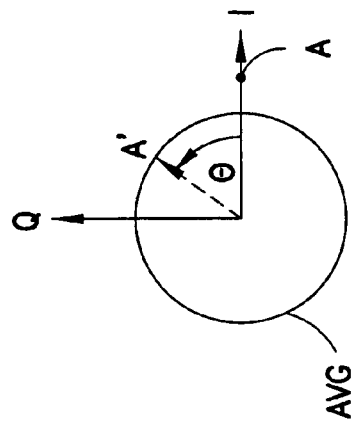
FIGS. 2A-2C are axis diagrams showing phase and magnitude of a vector relative to an average value according to FIG. 2.
Figure 2B:
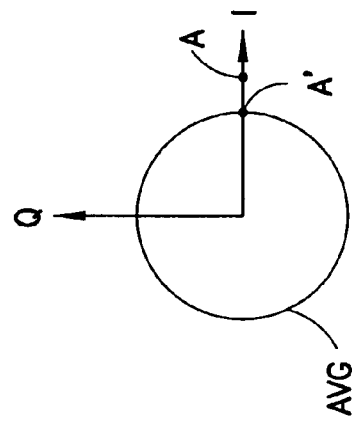
Figure 2A:
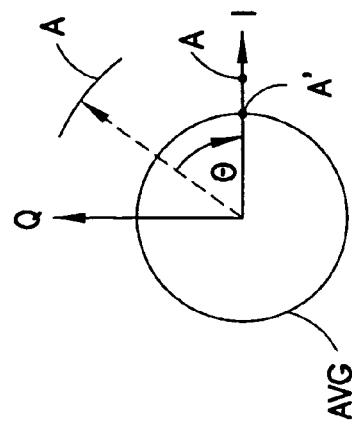

In the clipping circuit 20, CORDIC 22 operates in rotation mode using similar recursive update equations and initialization $2x_0=A'$ and $2y_0=0$. CORDIC 22 in the clipper block 20 restore the angle to the scaled and clipped amplitude. As shown in FIGS. 2A-2C, CORDIC 22 operating in rotation mode converts the clipped signal from polar back to Cartesian coordinates.

In clipping circuit 20, $d_i^1=-d_i^2$, where $d_i^1$ are values used in CORDIC rotator 21 and where $d_i^2$ are the values used in CORDIC rotator 22. Since the $d_i^1$ values computed in CORDIC rotator 21 are the negative of the $d_i^2$ values required in CORDIC rotator 22, the $d_i^1$ values are stored for subsequent use in CORDIC rotator 22. Sign inverter 28 reverses the sign of $d_i^1$ and couples the output to CORDIC rotator 22. It will be appreciated that knowledge of the $d_i^2$ values eliminates the need for z accumulator update hardware and the corresponding arctan($2^{-i}$) look-up-table (ATAN-LUT) in both CORDICs 21,22; advantageously reducing hardware complexity by approximately 25 percent per CORDIC. CORDIC rotator 22 then iterates according to:

$$x_{i+1}=x_i-y_i d_i^2 2^{-i}$$

$$y_{i+1}=y_i-x_i d_i^2 2^{-i}$$

$$d_i^2=-1 \cdot d_i^1$$

Notice that in the circular clipping circuit 20, neither CORDIC requires a z accumulator or a corresponding ATAN-LUT. It should further be noted that in FIG. 2, the d variable is a direction vector with $d=[d_0^1, d_1^1, \ldots, d_I^1]$.

Figure 3:
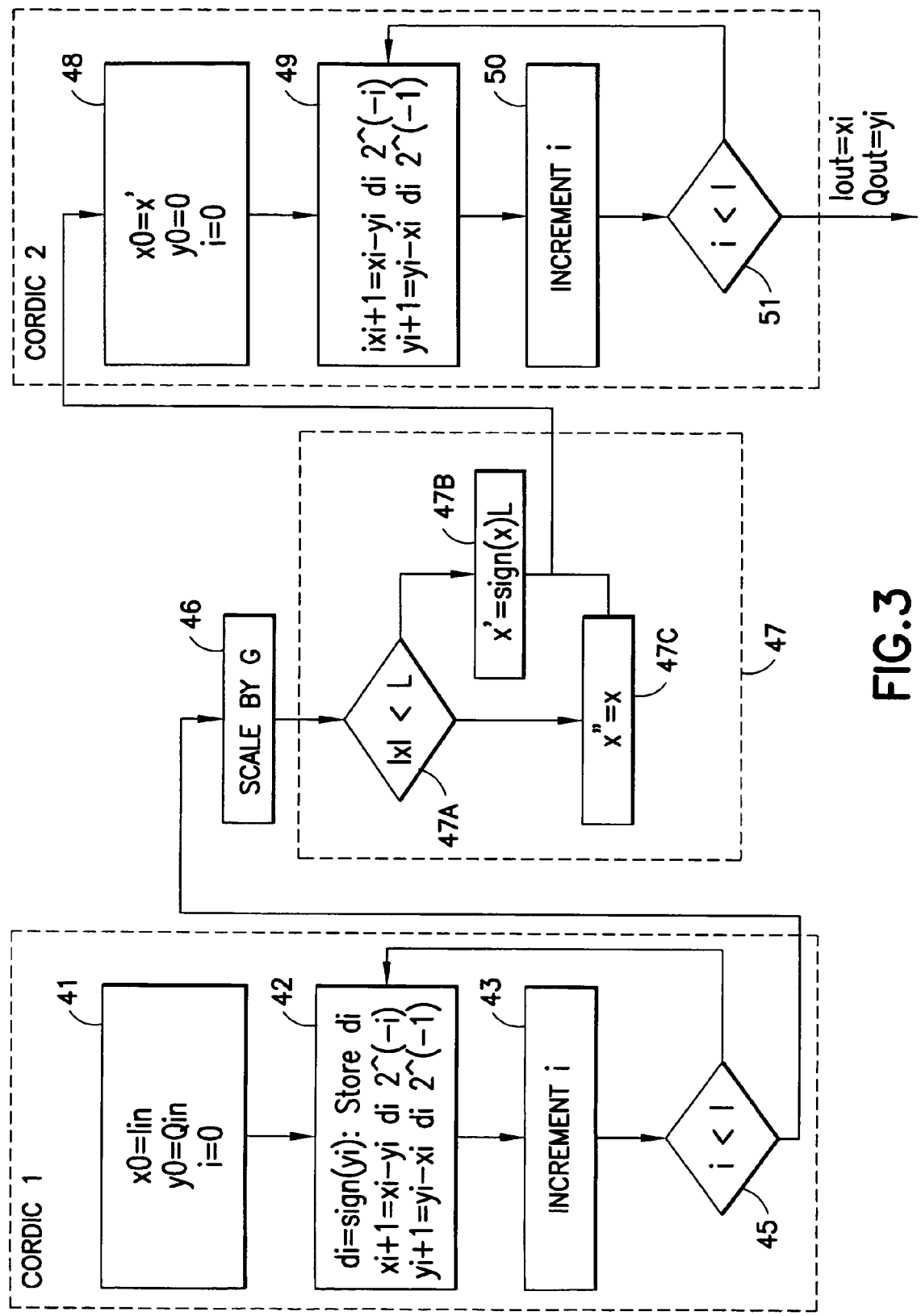
FIG. 3 is a flow chart of one method for implementing the baseband limiting features of the present invention shown in FIG. 2.

Referring also to FIG. 3, there is shown a method flow chart illustrating the steps of one method for implementing the invention shown in FIG. 2. First, a vector quantity is derived from $I_{in}$ and $Q_{in}$ signal values and an iteration counter is set to 1, step 41. In alternate embodiments the $I_{in}$ and $Q_{in}$ may be summed composites of multiple $I_0 \ldots I_n$ and $Q_0 \ldots Q_n$ signals, respectively. In alternate embodiments summers 26,27 may be any suitable device for combining multiple I and Q signals. A sign indicator is derived from the $I_{in}$ and $Q_{in}$ signals and stored, step 42, in vector d (not shown), within CORDIC rotator 21. Step 43 increments the iteration counter and a new sign ($d_i$) is again calculated and stored, step 42, Note, that upon exiting step 45, an appropriate number of iterations result in the vector magnitude laying substantially in the x-plane. The vector magnitude A is then scaled, step 46, by scaler G and hard-limited if necessary, step 47, to a predetermined maximum 8-bit amplitude by limiter L as shown in FIGS. 2A-2C. Scaler 23 allows input signals that do not exceed the rails of the hard-limiter L to be scaled and may be varied as number of users varies to maintain constant average power output. The scaled and clipped signal polar coordinate signal, along with direction vector d, is coupled to CORDIC 22. CORDIC 22, operating in rotation mode effectively rotates the clipped vector through an angle according to the inverse of the direction vector d (e.g. −1d) and produces 8-bit $I_{out}$ and $Q_{out}$ components, steps 48-51. Knowledge of the input peak-to-average power ratio ($PAR_{in}$) and component specifications allows the scaler 23 and hard-limiter L value to be chosen to such that a desired output peak-to-average power ratio ($PAR_{out} \le PAR_{in}$) is achieved.

It is appreciated therefore that an efficient baseband circular clipping method and system to decrease a peak-to-average power ratio of a telecommunications signal before the signal is amplified by a power amplifier has been provided. Advantageously, the method and system provided avoids the need for an accumulator and ATAN look-up-tables. The method and system advantageously also offers significant reductions in the number of gates needed to implement the circular clipping relative to the LUT approaches of the prior art when the number of possible input combinations is large. The method and system also advantageously provides efficient baseband circular clipping without mathematically intensive square root, and division functions.

It should be understood that the foregoing description is only illustrative of the invention. Various alternatives and modifications can be devised by those skilled in the art without departing from the invention. Exemplary alternatives include, but are not limited to, employing the improved CORDIC devices in trigonometric calculators, fast Fourier transformers (FFTs), and Digital Fourier Transforms (DFTs). Accordingly, the present invention is intended to embrace all such alternatives, modifications and variances that fall within the scope of the appended claims.

What is claimed is:

1. A system for the efficient use of CORDIC rotators, the system comprising:
at least one first rotator, wherein the at least one first rotator comprises at least one first sign storage buffer;
a first gain device, wherein the first gain device is coupled to the at least one first rotator;
a first limiter, wherein the first limiter is coupled to the first gain device;

at least one bit inverter, wherein the at least one bit inverter is coupled to the at least one first rotator; and at least one second rotator, wherein the at least one second rotator comprises at least one second sign storage buffer, and wherein the at least one second rotator is coupled to the at least one first rotator;

wherein the at least one first rotator operates in a vector mode and the at least one second rotator operates in a rotation mode.

2. A system as in claim 1 wherein the at least one first rotator comprises a first Coordinate Rotation Digital Computer (CORDIC).

3. A system as in claim 2 wherein the first CORDIC device comprises a first field programmable gate array (FPGA).

4. A system as in claim 2 wherein the first CORDIC device comprises a first application specific integrated circuit (ASIC).

5. A system as in claim 2 wherein the at least one second rotator comprises a second Coordinate Rotation Digital Computer (CORDIC) device.

6. A system as in claim 5 wherein the first CORDIC device comprises a first field programmable gate array (FPGA) and the second CORDIC device comprises a second FPGA.

7. A system as in claim 5 wherein the first CORDIC device comprises a first application specific integrated circuit (ASIC) and the second CORDIC device comprises a second ASIC.

8. A system for the efficient use of CORDIC rotators, the system comprising:

at least one first rotator, wherein the at least one first rotator comprises at least one first sign storage buffer;

at least one bit inverter, wherein the at least one bit inverter is coupled to the at least one first rotator; and at least one second rotator, wherein the at least one second rotator comprises at least one second sign storage buffer and wherein the at least one second rotator is coupled to the at least one first rotator;

wherein the at least one first rotator operates in a vector mode and the at least one second rotator operates in a rotation mode.

9. A system as in claim 8 wherein the at least one first rotator is a first CORDIC rotator.

10. A system as in claim 8 wherein the at least one second rotator is a second CORDIC rotator.

11. A method for efficiently limiting a vector magnitude, the method comprising the steps of:

providing a first vector, the first vector comprising:
  a first magnitude;
  a first angle, wherein the first angle is determined from a reference axis;

rotating the first vector such that the first angle is substantially zero, wherein rotating the first vector further comprises the steps of:
  rotating the first vector through a plurality of angles where each angle within the plurality of angles is an opposite direction to the preceding angle;
  successively storing each angle direction in a first direction matrix vector;

limiting the first magnitude to a predetermined magnitude to form a second vector; and rotating the second vector through a second angle according to each angle direction in the first direction matrix vector.

12. Apparatus for efficiently limiting a vector magnitude, the apparatus comprising:

means for providing a first vector, the first vector comprising:
  a first magnitude;
  a first angle, wherein the first angle is determined from a reference axis;

means for rotating the first vector such that the first angle is substantially zero, wherein the means for rotating the first vector further comprises:
  means for rotating the first vector through a plurality of angles where each angle within the plurality of angles is an opposite direction to the preceding angle;
  means for successively storing each angle direction in a first direction matrix vector;

means for limiting the first magnitude to a predetermined magnitude to form a second vector; and means for rotating the second vector through a second angle according to each angle direction in the first direction matrix vector.

* * * * *